(12) United States Patent
Struve et al.

(10) Patent No.: US 7,040,575 B2
(45) Date of Patent: May 9, 2006

(54) FOAM COMPOSITE INSULATION FOR AIRCRAFT

(75) Inventors: Richard G. Struve, Seattle, WA (US); Randall S. Smith, Seattle, WA (US); Adam R. Weston, Seattle, WA (US); Hossein Farange, Snohomish, WA (US); Nigel G. Moores, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/708,858

(22) Filed: Mar. 29, 2004

(65) Prior Publication Data

US 2005/0211838 A1 Sep. 29, 2005

(51) Int. Cl.
*B64D 11/00* (2006.01)
(52) U.S. Cl. .................................................. 244/118.5
(58) Field of Classification Search ............. 244/118.5, 244/118.6, 119, 120, 125, 129.2, 133, 130, 244/207, 200, 199, 13, 118.1, 118.2
See application file for complete search history.

(56) References Cited

U.S. PATENT DOCUMENTS

| | | | | |
|---|---|---|---|---|
| RE31,340 E | * | 8/1983 | Blount | 524/650 |
| 4,454,248 A | * | 6/1984 | Pollock et al. | 521/53 |
| 4,929,969 A | * | 5/1990 | Morris | 347/87 |
| 5,219,648 A | * | 6/1993 | Morimoto et al. | 428/316.6 |
| 5,251,849 A | * | 10/1993 | Torres | 244/117 R |
| 5,312,848 A | * | 5/1994 | Klapper et al. | 521/172 |
| 5,918,644 A | * | 7/1999 | Haack et al. | 138/151 |
| 5,985,362 A | * | 11/1999 | Specht et al. | 427/236 |
| 6,712,315 B1 | * | 3/2004 | Schmidt et al. | 244/117 R |
| 6,720,363 B1 | * | 4/2004 | Subramonian et al. | 521/81 |
| 6,722,611 B1 | * | 4/2004 | Wu et al. | 244/126 |
| 2001/0041753 A1 | * | 11/2001 | Thom | 521/187 |

OTHER PUBLICATIONS

"Foam-Tech: Urethane Roam—Open Cell vs. Closed Cell", pp. 1-2, www.foam-tech.com.*

* cited by examiner

*Primary Examiner*—Teri Pham Luu
*Assistant Examiner*—S A Holzen (57) ABSTRACT

Insulation for use in an aircraft fuselage is formed wherein at least one layer made from an open-celled foam that provides acoustic and thermal insulation. The open-celled foam is compression fitted into the airplane fuselage so as to provide effective attachment to the fuselage. The open-celled foam requires minimal attachment treatments. Further, compression fit of the open cell layer is used as an interface around brackets and unrelated hardware to provide superior close-out of gaps that would normally occur using traditional insulation to bracket interfaces. The preferred foam for the open celled compression layer is also relatively moisture resistant (i.e. hydrophobic) in nature and is compressible to between about 0.5 and 10 percent compression, with about 2% compression being ideal for most applications.

27 Claims, 10 Drawing Sheets

FOAM COMPOSITE INSULATION FOR AIRCRAFT

BACKGROUND OF INVENTION

The present invention generally relates to insulation and more specifically to a foam composite insulation for aircraft.

Insulation is typically provided on the exterior and/or interior of aerospace systems, particularly between the outer bodies and the internal passenger compartments of aircraft fuselages. The insulation provides a number of functions including regulation of temperature, reduction of engine noise, reduction of noise from outside air turbulence, and protection of mechanical and structural components within the aerospace systems from moisture and temperature extremes that might tend to damage or corrode the components. All of these functions are enhanced by the close contact of insulation to fuselage surfaces including frames, stringers and skin, as well as close contacting fit to brackets and unrelated hardware that is fastened to the fuselage.

Until recently, fiberglass batting had been the preferred insulation for use within aircraft and other aerospace structures. Fiberglass has good thermal and structural properties, is fairly inexpensive, and has a long history of successful use in the aerospace industry.

Recently, foam insulation has been introduced for fuselage insulation. In fact, many companies use closed cell foam as a layer for fuselage insulation, while others use a polyimide type open cell foam. However, the use of foams is typically limited to where the foam layer is designed for interlocking fit. Interlocking fit designs are a problem because they are limited to fuselage designs that coincidentally have structural flanges that allow the insulation to be tucked (i.e. to be interlocked) behind the string flanges, or behind the intercostals, thereby creating the interlocking fit.

Closed cell foams are also desirable because they are relatively moisture resistant. However, thin closed cell foams also do not typically provide adequate noise absorption for use in aircraft fuselages. As such, the amount of closed cell foam that must be used adds to manufacturing costs in terms of raw material costs, installation costs, weight, and space constraints.

It is thus highly desirable to create a new acoustical and thermal insulation that is easy to use and install. It is also desirable that the insulation be cost effective in terms of fabrication, installation and life cycle. It is also desirable that the insulation be relatively water resistant.

SUMMARY OF INVENTION

The present invention addresses these concerns by providing material and method for insulating an aircraft. The invention provides for the use of multiple layers of insulation with at least one layer made from an open-celled foam that provides acoustic and thermal insulation.

The open-celled foam is compression fitted into the airplane fuselage so as to provide effective attachment to the fuselage. The open-celled foam requires minimal attachment treatments. Further, compression fit of the open cell layer is used as an interface around brackets and unrelated hardware to provide superior close-out of gaps that would normally occur using traditional insulation to bracket interfaces. The preferred foam for the open celled compression layer is also relatively moisture resistant (i.e. hydrophobic) in nature and is compressible to between about 0.5 and 10 percent compression, with about 2% compression being ideal for most applications.

Other objects and advantages of the present invention will become apparent upon considering the following detailed description and appended claims, and upon reference to the accompanying drawings.

DETAILED DESCRIPTION

In the following figures the same reference numerals will be used to refer to the same components. The present invention is related to providing a material and method for insulating an aircraft 20. The invention calls for the use of multiple layers of insulation materials with at least one layer being made of a hydrophobic, open-celled foam material that provides acoustic and thermal insulation. The open-celled foam is compression fit within the airplane fuselage 22 so as to provide an effective attachment. Ten preferred embodiments are described below. However, as one of ordinary skill recognizes, many other possible embodiments utilizing at least one layer of hydrophobic, open-celled foam material are possible, and as such the preferred embodiments are not intended to be limiting.

Figure 1:
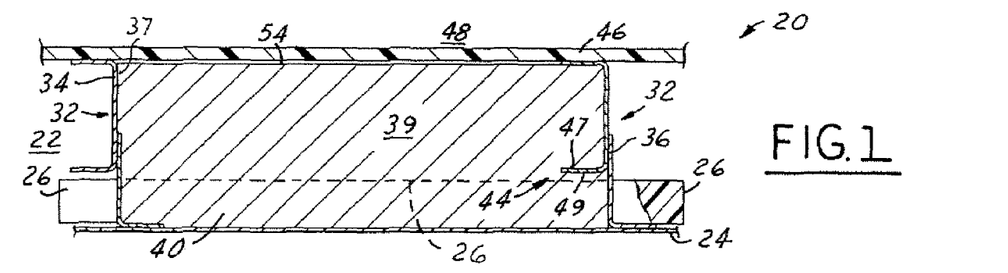
FIG. 1 is a top section view of an insulation material according to one preferred embodiment of the present invention.
Figure 2:
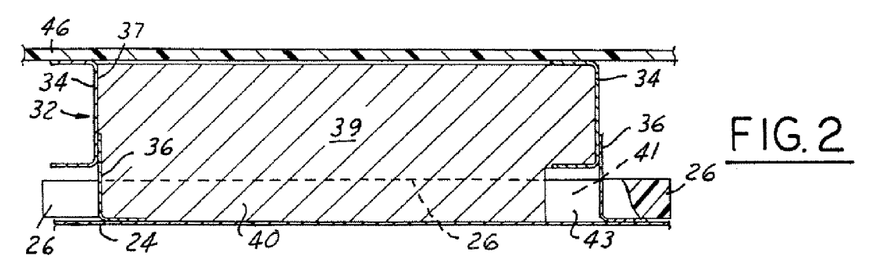
FIG. 2 is a top section view of an insulation material according to another preferred embodiment of the present invention.

Referring now to FIGS. 1 and 2, a preferred embodiment of the present invention is illustrated in which a fuselage is illustrated having an outer skin 24. Coupled to the inner surface 25 of the outer skin 24 is a plurality of spaced apart stringers 26 that extend latitudinally (shown as left to right in FIG. 1) across the surface of the outer skin 24. In other words, stringers 26 run the length of the airplane from the front, or tip, to the back. The stringers 26 aid in reinforcing the outer skin 24.

Also shown is a pair of frames 32 that extend longitudinally from the outer skin and provide attachment points for various hardware commonly found in commercial aircraft 20. The frames 32 run circumferentially, like discrete hoops, around the airplane interior 48. Each frame 32 is shown in FIG. 1 as having a c-shaped frame element 34 coupled to an I-shaped frame element 36. The I-shaped frame element 36 is also known as a shear tie 36. A trim piece 46 is then coupled across the exterior of the foam 40 and frames 32 to provide a pleasing aesthetic surface to the interior 48, or cabin region, of the aircraft 20.

A layer 40 of open-celled foam 39, also known as a bay block of foam, is shown being compression fit between the respective frames 32. The foam 40 is shaped such that it substantially abuts and surrounds each of the respective stringers 26 contained between a respective pair of frames 32. A cut out portion 44 of the layer 40 allows the layer 40 to be compression fit to both inner extending portion 47 and bottom portion 49 the c-shaped frame element 34 and I-shaped frame element 36 located on the right side of FIG. 1. The cutout portion 44 therefore allows for a tighter compression fit of the layer 40 between the frames 32.

As shown in FIG. 2, a portion 41 of the foam 40 is preferably removed between the bottom of the c-shaped frame element 34 and the outer skin 24 to form a channel 43 as a condensate water-control channel to facilitate drainage.

The open-celled foam 39 of the present invention has high sound absorption, high heat resistance, good fire-proofing properties, and good flexibility and is very easy to process. In addition, the foam is compressible to between about 0.5 and 10 percent compression, with about 2% compression being ideal for most applications. One preferred foam composition meeting these requirements are melamine-based open-celled thermosetting foam such as Basotect®, produced by BASF Corporation of Mount Olive, N.J. Basotect® foams are thermoset from a group of aminoplastic resins, including various phenolic resins.

In order to impart adequate moisture resistance (i.e. make the foam layer hydrophobic) for application in the interior of the aircraft 20, it is desirable to coat the foam 39 with a moisture resistant compound. One preferred moisture resistant compound is silicon, typically applied as a spray to the previously formed open cells.

The foam 39 is formed by conventional foaming methods and cured to the desired physical characteristics, including the desired compressibility and density. The foam 39 is then cut to a desired size and shape to form a layer, such as layer 40.

The trim piece 46 is preferably formed of a composite material and is approximately one-eighth of an inch in thickness. One preferred composite material is based on a carbon fiber reinforced phenol/formaldehyde material. In addition, a honeycombed layer of Nomex® may be incorporated within the composite panel to provide additional thermal resistance properties.

Figure 3:
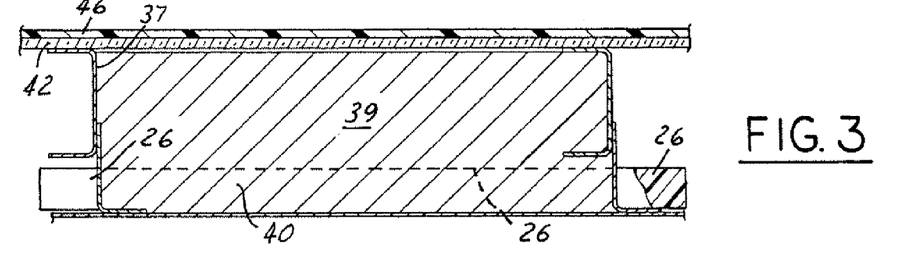
FIG. 3 is a top section view of an insulation material according to another preferred embodiment of the present invention.

Referring now to FIG. 3, another preferred embodiment of the present invention introduces a layer, or overblanket, of non-woven spun-laced fiber fabric 42 that is applied to the exposed surface 54 of the foam layer 40 and a portion of the respect c-shaped frames 34 to bridge across multiple frames 32. The trim piece 46 is then coupled across the exterior of the non-woven spun-laced fiber fabric 42 to provide a pleasing aesthetic surface to the interior 48, or cabin region, of the aircraft 20.

The non-woven spun-laced fiber fabric 42 is preferably a fire-resistant, lightweight fabric that is typically honeycomed to provide increased strength for aircraft. One preferred fabric meeting these requirements is Nomex® felt fabric, available from E. I. duPont De Nemours and Company of Wilmington, Del.

Figure 4:
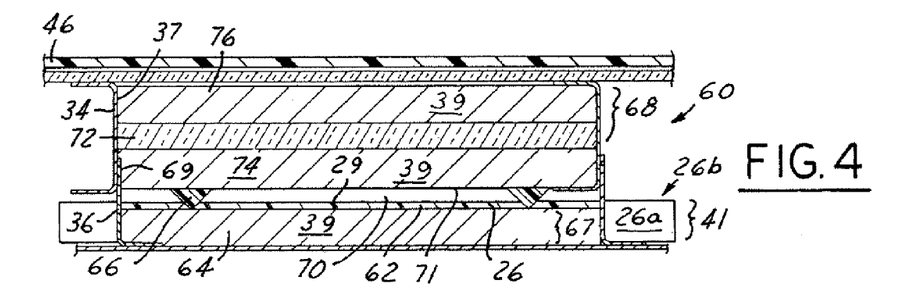
FIG. 4 is a top section view of an insulation material according to another preferred embodiment of the present invention.

In another preferred embodiment, as shown in FIG. 4, a five layer insulation material 60 is shown which is useful for acoustic attenuation. The five-layer insulation material has a first layer 64 of insulation material separated from a second three-piece layer 68 of insulation material via an air gap 62. A first layer 64 of open-celled foam 39 is shown being compression fit between the respective frames 32 on either side 26a, 26b of and between each respective stringer 26. The first layer 64 is shaped such that it substantially abuts each side 26a, 26b (the first layer 64 is shown abutting a top side 26a of one of the stringers 26 in FIG. 3) of the respective stringers 26 contained between a respective pair of I-shaped frame elements 36. A plurality of spacers 66 are then coupled to an outer surface 65 of each respective first layer 64.

As shown in FIG. 4, the length 41 that the respective stringer 26 extends from the outer skin 24 is slightly greater than the length 67 that the respective first layers 64 extend from the outer skin 24. However, in other preferred embodiments the length 67 of the respective first layer 64 may be equal to the length 41 of the stringers 26.

A three-piece layer 68 is placed onto the spacers 66 and compression fit with an inner side 35 a c-shaped frame element 34 on one side and a top portion 69 of the I-shaped frame element 36 and an outer side 37 of the c-shaped frame element 34 on the opposite side. The air gap 62 is thus created between the bottom surface 71 of the second layer 68 and the respective first layers 64 and is defined by the thickness t of the respective spacers 66. A smaller air gap 70 is also present between the bottom surface 71 and the top surface 29 of the respective stringer 26 wherein the length 41 is greater than the length 67.

The three-piece layer 68 is formed having an interleaved fibrous layer 72 coupled between a second layer 74 and third layer 76 of open-celled foam 39. A non-woven spun-laced fiber fabric 42 is applied onto the third layer 76 of open-celled foam 39. A trim piece 46 is then coupled across the exterior of the fabric 42 and frames 32 to provide a pleasing aesthetic surface to the interior 48, or cabin region, of the aircraft 20.

The interleaved fibrous layer 72, as shown in FIG. 3, is preferably formed from fiberglass batting, or fibrous glass blanket, consisting of a plurality of glass wool fibers having an aspect ratio of greater than about 3:1 coated with a phenol-formaldehyde resin binder and having a density of between about 0.4 and 1.5 pounds per cubic inch. One preferred fibrous glass blanket is produced by the Johns Manville Corporation of Denver, Colo. under the Microlite® AA blanket tradename designations, in which a fiberglass wool product (80–99 wt. %) is bound with either a extended phenol-formaldehyde cured binder resin (1–20 wt. %) or a urea-extended phenol-melamine-formaldehyde cured binder resin (1–20 wt. %). The binder may also include a silicone emulsion (1–10 wt. %).

The fiberglass batting is preferably contained within a heat sealable durable covering film that limits water vapor absorption to the fiberglass batting. One preferred covering film is Orcofilm® AN-54W, produced by Orcon Corporation of Union City, Calif.

Figure 5:
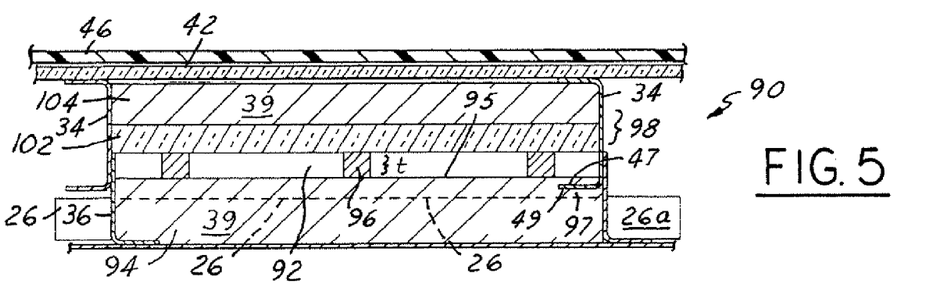
FIG. 5 is a top section view of an insulation material according to another preferred embodiment of the present invention.

Referring now to FIG. 5, another embodiment of the present invention, a three-layer insulation material 90 is shown including an air gap 92 separating the first insulation material 91 from the second insulation material 93, which is useful for acoustic attenuation. A first layer 94 of open-celled foam 39 forming the first insulation material 91 is shown being compression fit between the respective frames 32 on either side of and between each respective stringer 26.

The first layer 94 is shaped such that it substantially abuts each side and surrounds each of the respective stringers 26 contained between a respective pair of I-shaped frame elements 36. A cut out portion 97 of the first layer 94 allows the layer 94 to be compression fit to both inner portion 47 and bottom portion 49 the c-shaped frame element 34 and I-shaped frame element 36 located on the right side of FIG. 5. This cutout portion 97 allows a tighter compression fit between the frames 32.

A plurality of open-celled foam spacers 96 are then coupled to an outer surface 95 of each respective first layer 94. The open-celled foam spacers 96 have the same composition as the open-celled foam 39 in the first layer 94.

The second insulation material 93 if formed of a two-piece layer 98 that is placed onto the spacers 96 and compression fit with an inner side 35 of the c-shaped frame element 34 on one side and a top portion 69 of the I-shaped frame element 36 and an outer side 37 of the c-shaped frame element 34 on the opposite side. An air gap 92 is created between the bottom surface 101 of the second layer 98 and the respective first layer 94 and is defined by the thickness t of the respective spacers 96.

The two-piece layer 98 is formed having an interleaved fibrous layer 102 coupled to a second layer 104 of open-celled foam 39. A non-woven spun-laced fiber fabric 42 is applied onto the second layer 104 of open-celled foam. A trim piece 46 is then coupled across the exterior of the fabric 42 and frames 32 to provide a pleasing aesthetic surface to the interior 48, or cabin region, of the aircraft 20.

A non-woven spun-laced fiber fabric 42 is applied onto the two-piece layer 98. A trim piece 46 is then coupled across the exterior of the fabric 42 and frames 32 to provide a pleasing aesthetic surface to the interior 48, or cabin region, of the aircraft 20.

Figure 6:
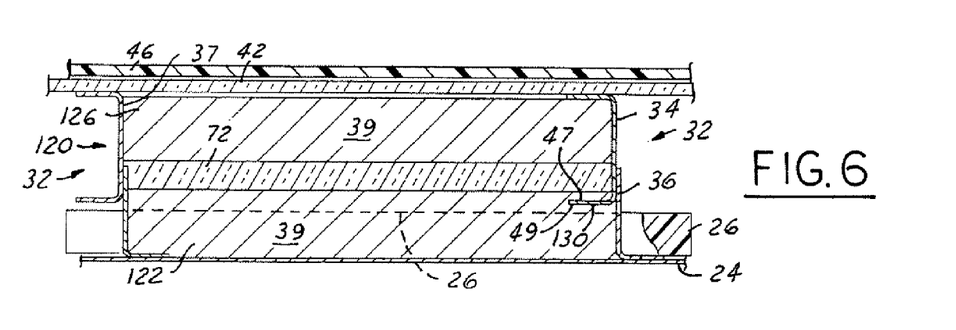
FIG. 6 is a top section view of an insulation material according to another preferred embodiment of the present invention.

In yet another preferred embodiment of the present invention, as shown in FIG. 6, a three-layer insulation material 120 is compression fit between the respective frames 32. The three-layer insulation material 120 a layer of interleaved fibrous material 72 sandwiched between two layers 122, 126 of the open cell foam 39. A cut out portion 130 of the lower layer 122 allows the layer 122 to be compression fit to both inner portion 47 and bottom portion 49 the c-shaped frame element 34 and I-shaped frame element 36 located on the right side of FIG. 6. This cut out portion 130 allows a tighter compression fit of the lower layer 122 between the frames 32.

A non-woven spun-laced fiber fabric 42 is applied onto the three-layer insulation material 120. A trim piece 46 is then coupled across the exterior of the fabric 42 and frames 32 to provide a pleasing aesthetic surface to the interior 48, or cabin region, of the aircraft 20.

Figure 7:
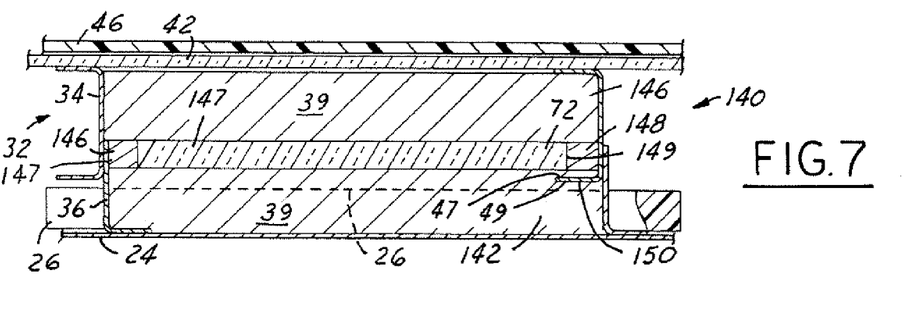
FIG. 7 is a top section view of an insulation material according to another preferred embodiment of the present invention.

Referring now to FIG. 7, a three-layer insulation material 140 is compression fit between the respective frames 32 between the frames 32. The three-layer insulation material 140 a layer of interleaved fibrous material 72 sandwiched between two layers 142, 144 of the open cell foam 39. A foam spacer 146 is sandwiched between one end 147 of the fibrous material 72 and the top portion 69 of the I-shaped frame element 36. A second foam spacer 148 is sandwiched between the other end 149 of the fibrous material 72 and an inner portion 47 of the c-shaped frame element 34 located on the right side of FIG. 7. A cut out portion 150 of the lower layer 142 allows the layer 142 to be compression fit to both inner portion 47 and bottom portion 49 the c-shaped frame element 34 and I-shaped frame element 36 located on the right side of FIG. 7. This cut out portion 150 allows a tighter compression fit of the lower layer 142 between the frames 32.

A non-woven spun-laced fiber fabric 42 is applied onto the three-layer insulation material 140. A trim piece 46 is then coupled across the exterior of the fabric 42 and frames 32 to provide a pleasing aesthetic surface to the interior 48, or cabin region, of the aircraft 20.

Figure 8:
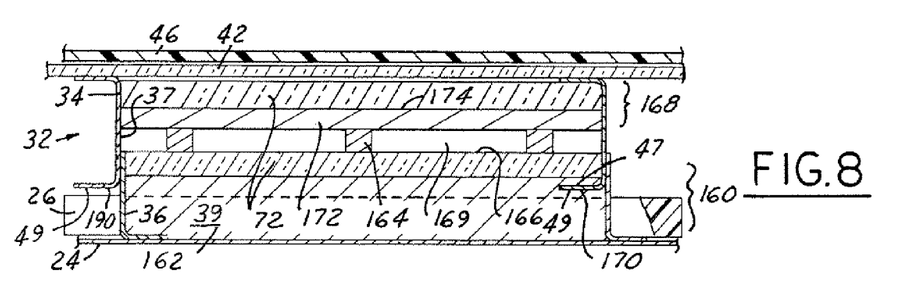
FIG. 8 is a top section view of an insulation material according to another preferred embodiment of the present invention.

In another preferred embodiment, as shown in FIG. 8, a first two-layer insulation material 160 is compression fit between the respective frames 32. A plurality of spacers 164 each comprised of the open-cell foam 39 are coupled to the top surface 166 of the two-layer insulation material 160. A second two-layer insulation material 168 is placed onto the spacers 164 and compression fit within the inner portion 47 of the c-shaped frame element 34 on the right side of FIG. 8 and the outer portion 37 of the other c-shaped frame element 34 on the left side of FIG. 8. The spacers 164 therein create an air gap 169 between the first 160 and second two-layer insulation materials 168, respectively.

The first two-layer insulation material 160 consists of a first layer 162 of open-celled foam 39 and a layer of interleaved fibrous material 72 applied to its top surface. A cut out portion 170 of the first layer 162 allows the layer 162 to be compression fit to both inner portion 47 and bottom portion 49 the c-shaped frame element 34 and I-shaped frame element 36 located on the right side of FIG. 8. This cut out portion 170 allows a tighter compression fit of the lower layer 162 between the frames 32.

The second two-layer insulation material 168 consists of a first layer 172 of open-celled foam 39 and a layer of interleaved fibrous material 72 applied to its top surface 174.

A non-woven spun-laced fiber fabric 42 is applied onto the two-layer insulation material 168. A trim piece 46 is then coupled across the exterior of the fabric 42 and frames 32 to provide a pleasing aesthetic surface to the interior 48, or cabin region, of the aircraft 20.

Figure 9:
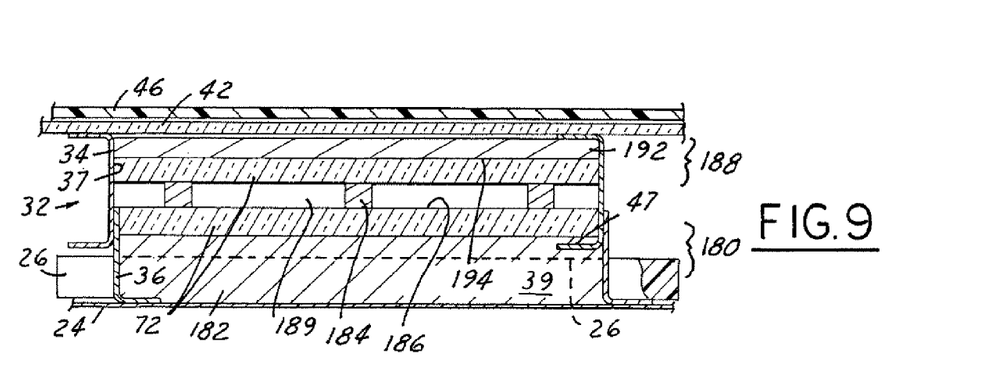
FIG. 9 is a top section view of an insulation material according to another preferred embodiment of the present invention.

In another preferred embodiment, as shown in FIG. 9, a first two-layer insulation material 180 is compression fit between the respective frames 32. A plurality of spacers 184 each comprised of the open-cell foam 39 are coupled to the top surface 186 of the two-layer insulation material 180. A second two-layer insulation material 188 is placed onto the spacers 184 and compression fit within the inner portion 47 of the c-shaped frame element 34 on the right side of FIG. 9 and the outer portion 37 of the other c-shaped frame element 34 on the left side of FIG. 9. The spacers 184 therein create an air gap 189 between the first 180 and second two-layer insulation materials 188, respectively.

The first two-layer insulation material 180 consists of a first layer 182 of open-celled foam 39 and a layer of interleaved fibrous material 72 applied to its top surface. A cut out portion 190 of the first layer 162 allows the layer 182 to be compression fit to both inner portion 47 and bottom portion 49 the c-shaped frame element 34 and I-shaped frame element 36 located on the right side of FIG. 8. This cut out portion 190 allows a tighter compression fit of the lower layer 182 between the frames 32.

The second two-layer insulation material 188 consists of a first layer 192 of open-celled foam 39 and a layer of interleaved fibrous material 72 applied to its bottom surface 194.

A non-woven spun-laced fiber fabric 42 is applied onto the two-layer insulation material 188. A trim piece 46 is then coupled across the exterior of the fabric 42 and frames 32 to provide a pleasing aesthetic surface to the interior 48, or cabin region, of the aircraft 20.

Figure 10:
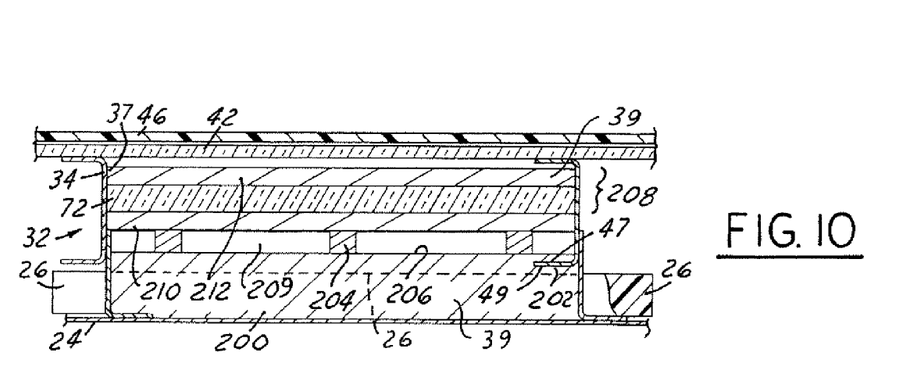
FIG. 10 is a top section view of an insulation material according to another preferred embodiment of the present invention.

In another preferred embodiment, as shown in FIG. 10, a first layer 200 of open-celled foam 39 is compression fit between the respective frames 32. A cut out portion 202 of the first layer 200 allows the layer 200 to be compression fit to both inner portion 47 and bottom portion 49 the c-shaped frame element 34 and I-shaped frame element 36 located on the right side of FIG. 8. This cut out portion 202 allows a tighter compression fit of the lower layer 200 between the frames 32.

A plurality of spacers 204 each comprised of the open-cell foam 39 are coupled to the top surface 206 of the first layer 200. A three-layer insulation material 208 is placed onto the spacers 204 and compression fit within the inner portion 47 of the c-shaped frame element 34 on the right side of FIG. 8 and the outer portion 37 of the other c-shaped frame element 34 on the left side of FIG. 8. The spacers 204 therein create an air gap 209 between the first layer 200 and the three-layer insulation material 208.

The second two-layer insulation material 208 consists of a layer of interleaved fibrous material 72 sandwiched between a second layer 210 and third layer 212 of open-cell foam 39.

A non-woven spun-laced fiber fabric 42 is applied onto the two-layer insulation material 208. A trim piece 46 is then coupled across the exterior of the fabric 42 and frames 32 to provide a pleasing aesthetic surface to the interior 48, or cabin region, of the aircraft 20.

The present invention provides a simplified manufacturing approach to insulating the fuselage of an aircraft. The open-celled foam is compression fitted into the airplane fuselage so as to provide effective attachment to the fuselage. The open-celled foam requires minimal attachment treatments. Further, compression fit of the open cell layer is used as an interface around brackets and unrelated hardware to provide superior close-out of gaps that would normally occur using traditional insulation to bracket interfaces. In addition, the use of compression fitted foams simplifies inspection of the fuselage due to the ease in removing or replacing the open-cell foam 39. Further, the introduction of open-cell foam provides superior acoustical insulation properties as compared with prior art foam structures and with prior art insulation systems not utilizing foams. Also, the open-cell foam provides thermal insulation properties. In addition, the use of open-cell foam allows for the introduction of air gaps within the insulation, which provides additional acoustical properties and minimizes weight.

While the invention has been described in terms of preferred embodiments, it will be understood, of course, that the invention is not limited thereto since modifications may be made by those skilled in the art, particularly in light of the foregoing teachings.

The invention claimed is:

1. A method for insulating the fuselage of an aircraft, the fuselage having an outer skin, a plurality of stringers coupled to and extending latitudinally along said outer skin, and a plurality of frames coupled to said plurality of stringers and said outer skin and extending longitudinally along said outer skin, the method comprising:
    forming a hydrophobic, open-cell foam structure capable of being compressed between about 0.5 and 10 percent, wherein said hydrophobic, open-cell foam structure comprises a melamine-based, thermosetting open-cell foam structure;
    applying a moisture resistant compound to said melamine-based open-celled thermosetting foam;
    sizing said hydrophobic, open-celled foam structure to fit between an adjacent pair of said plurality of frames;
    compression fitting at least one layer of said hydrophobic, open-cell foam structure between said adjacent pair of frames such that said layer substantially covers at least one of the plurality of stringers; and
    coupling a trim piece over said layer such that said layer is sandwiched between said trim piece and said outer skin.

2. The method of claim 1, wherein applying a moisture resistant compound comprises applying a silicon compound to said melamine-based open-celled thermosetting foam.

3. The method of claim 1, further comprising forming a channel within said hydrophobic, open-celled foam structure near said outer skin, said channel facilitating the removal of water from said hydrophobic, open-cell foam structure.

4. The method of claim 1, further comprising coupling a non-woven spun-laced fiber fabric layer between said trim piece and said hydrophobic, open-cell foam structure.

5. The method of claim 1, wherein compression fitting at least one layer of said hydrophobic, open-cell foam structure comprises:
    (a) introducing a first layer of said hydrophobic, open cell foam structure on either side of each of the stringers contained between an adjacent pair of frames such that each of said respective first layers is compression fit between said pair of frames, wherein each of said first layers has an outer surface, wherein the relative distance of a top portion of each of said stringers is located farther from the outer skin than the relative distance of each of said outer surfaces;
    (b) forming a first insulation material by:
    coupling a second interleaved fibrous layer between a second layer and a third layer of said hydrophobic, open-cell foam structure;
    (c) coupling a plurality of spacers to said outer surface of said each of said first layers such that each of said first layers is located between the outer skin and each of said plurality of spacers; and
    (d) coupling said first insulation material between said adjacent pair of frames such that said plurality of spacers are contained between said first layer and said first insulation material, therein forming an air gap between said first insulation material and said first layer, wherein said second layer and said third layer are compression fit between said adjacent pair of frames.

6. The method of claim 1, wherein compression fitting at least one layer of said hydrophobic, open-cell foam structure comprises:
    (a) compression fitting a first layer of said hydrophobic, open-cell foam structure between said adjacent pair of frames such that said layer substantially covers at least one of the plurality of stringers;
    (b) coupling a plurality of spacers onto said first layer;
    (c) forming an insulation material by:
    coupling an interleaved fibrous layer to a second layer of said hydrophobic, open-cell foam structure; and
    (d) coupling said insulation material onto said plurality of spacers and within said adjacent pair of frames such that said second layer is compression fit between said adjacent pair of frames.

7. The method of claim 1, wherein compression fitting at least one layer of said hydrophobic, open-cell foam structure comprises:
    (a) forming an insulation material by:
    coupling an interleaved fibrous layer to a first layer of said hydrophobic, open-cell foam structure;
    coupling a second layer of said hydrophobic, open-cell foam structure to said interleaved fibrous layer such that said interleaved fibrous layer is sandwiched between said first layer and said second layer; and (b) compression fitting said insulation material between said adjacent pair of frames such that said first layer substantially covers at least one of the plurality of stringers.

8. The method of claim 1, wherein compression fitting at least one layer of said hydrophobic, open-cell foam structure comprises:

(a) forming an insulation material by:
coupling an interleaved fibrous layer to a first layer of said hydrophobic, open-cell foam structure;
coupling a second layer of said hydrophobic, open-cell foam structure to said interleaved fibrous layer such that said interleaved fibrous layer is sandwiched between said first layer and said second layer;
coupling a spacer to each end of said interleaved fibrous layer, wherein each spacer is contained between said first layer and said second layer; and (b) compression fitting said insulation material between said adjacent pair of frames such that said first layer substantially covers at least one of the plurality of stringers.

9. The method of claim 1, wherein compression fitting at least one layer of said hydrophobic, open-cell foam structure comprises:

(a) forming a first insulation material by:
coupling a first interleaved fibrous layer to a first layer of said hydrophobic, open-cell foam structure;
(b) forming a second insulation material by:
coupling a second interleaved fibrous layer to a second layer of said hydrophobic, open-cell foam structure;
(c) compression fitting said first insulation material between said adjacent pair of frames such that said first layer substantially covers at least one of the plurality of stringers;
(d) coupling a plurality of spacers to a top surface of said first insulation material; and
(e) coupling said second insulation material between said adjacent pair of frames such that said plurality of spacers are contained between said first insulation material and said second insulation material, therein forming an air gap between said first insulation material and said second insulation material, wherein said second layer is compression fit between said adjacent pair of frames.

10. The method of claim 9, wherein said spacers are directly coupled to and between said first interleaved fibrous layer and said first layer.

11. The method of claim 9, wherein said spacers are directly coupled to and between said first interleaved fibrous layer and said second interleaved fibrous layer.

12. The method of claim 1, wherein compression fitting at least one layer of said hydrophobic, open-cell foam structure comprises:

(a) compression fitting a first layer of said hydrophobic, open-cell foam structure between said adjacent pair of frames such that said layer substantially covers at least one of the plurality of stringers;
(b) coupling a plurality of spacers onto said first layer;
(c) forming an insulation material by:
coupling an interleaved fibrous layer to one layer of said hydrophobic, open-cell foam structure;
coupling a second layer of said hydrophobic, open-cell foam structure to said interleaved fibrous layer such that said interleaved fibrous layer is sandwiched between said first layer and said second layer; and (d) coupling said insulation material between said adjacent pair of frames such that said plurality of spacers are contained between said first layer and said insulation material, therein forming an air gap between said insulation material and said first layer, wherein said second layer is compression fit between said adjacent pair of frames.

13. The method of claim 1 further comprising:
introducing a cutout portion to one layer of said at least one layers prior to compression fitting said one layer between said frames;
compression fitting said one layer of said hydrophobic, open-cell foam structure between said adjacent pair of frames such that said layer substantially covers a top section and a bottom section of a c-shaped frame element, wherein said c-shaped frame element comprises a portion each of said frames.

14. An insulation system for use in an aircraft fuselage, the fuselage having an outer skin, a plurality of stringers coupled to and extending latitudinally along an outer skin, and a plurality of frames coupled to a plurality of stringers and the outer skin and extending longitudinally along the outer skin, each of the plurality of frames having a c-shaped frame element coupled to an I-shaped frame element, the insulation system comprising:
a trim piece coupled to said at least one layer;
wherein said at least one layer comprises:
a first layer of a hydrophobic, open-cell foam structure compression fit between an adjacent air of the plurality of frames and closely coupled to the outer skin, wherein said first layer substantially covers at least one of the plurality of stringer, wherein said hydrophobic, open-cell foam structure comprise a melamine-based, thermosetting open-cell foam structure; and
a second layer of said hydrophobic, open-cell foam structure closely coupled to said trim piece; and
an interleaved fibrous layer sandwiched between said first layer and said second layer.

15. The insulation system of claim 14, wherein said hydrophobic, open cell foam structure comprising a melamine-based, thermosetting open cell foam structure is compressible to between about 0.5 and 10 percent compression.

16. The insulation system of claim 14, wherein a portion of said first layer of said hydrophobic, open-cell foam structure is removed to provide a drainage channel.

17. The insulation system of claim 14, wherein said first layer has a cut out portion, said cut out portion allowing said first layer to be compression fit to an inner extending portion and a bottom portion of one of said c-shaped frame elements.

18. The insulation system of claim 14 further comprising a pair of hydrophobic, open call spacer elements coupled to each end of said interleaved fibrous layer within said adjacent pair of said frames, each of said pair being located between said first layer and said second layer.

19. The insulation system of claim 18, wherein said first layer has a cut out portion, said cut out portion allowing said first layer to be compression fit to an inner extending portion and a bottom portion of one of said c-shaped frame elements.

20. An insulation system for use in an aircraft fuselage, the fuselage having an outer skin, a plurality of stringers coupled to and extending latitudinally along an outer skin, and a plurality of frames coupled to a plurality of stringers and the outer skin and extending longitudinally along the outer skin, each of the plurality of frames having a c-shaped frame element coupled to an I-shaped frame element, the insulation system comprising:
- a first insulation system including at least one layer of a hydrophobic, open-cell foam structure compression fit between an adjacent pair of the plurality of frames and closely coupled to the outer skin, wherein said at least one layer substantially covers at least one of the plurality of stringers, wherein said hydrophobic, open-cell foam structure comprises a melamine-based, thermosetting open-cell foam structure;
- wherein said at least one layer in said first insulation system located in closest proximity the outer skin has a cut out portion, said cut out portion allowing said at least one layer in said first insulation system to be compression fit to an inner extending portion and a bottom portion of one of said c-shaped frame element;
- a trim piece;
- a second insulation system including at least one layer of said hydrophobic, open-cell foam structure compression fit between said adjacent pair of the plurality of frames, said second insulation system being located between said first insulation system and said trim piece; and
- a plurality of spacers located between said first insulation system and said second insulation system, said plurality of spacers creating an air gap between said first insulation system and said second insulation system.

21. The insulation system of claim 20, wherein said hydrophobic, open cell foam structure comprising a melamine-based, thermosetting open cell foam structure is compressible to between about 0.5 and 10 percent compression.

22. The insulation system of claim 20 further comprising a layer of non-woven spun laced fiber fabric coupled between said second insulation system and said trim piece.

23. The insulation system of claim 20, wherein said first insulation system further comprises a layer of non-woven spun laced fiber fabric coupled between said layer, wherein said layer of non-woven spun laced fiber fabric is located between said layer and said plurality of spacers.

24. The insulation system of claim 20, wherein said second insulation system comprises:
- a second layer of said hydrophobic, open cell foam structure; and
- a layer of non-woven spun laced fiber fabric coupled between said second insulation system and said trim piece.

25. The insulation system of claim 20, wherein said second insulation system comprises:
- a second layer of said hydrophobic, open cell foam structure;
- a third layer of said hydrophobic, open cell foam structure; and
- a layer of non-woven spun laced fiber fabric coupled between said second layer and said third layer.

26. The insulation system of claim 23, wherein said second insulation system comprises:
- a second layer of said hydrophobic, open cell foam structure; and
- a layer of non-woven spun laced fiber fabric coupled between said second layer and said trim piece.

27. The insulation system of claim 23, wherein said second insulation system comprises:
- a layer of non-woven spun laced fiber fabric; and
- a second layer of said hydrophobic, open cell foam structure coupled between said layer of non-woven spun laced fiber fabric and said trim piece.

* * * * *